United States Patent
Matsuoka

(10) Patent No.: US 9,257,875 B2
(45) Date of Patent: Feb. 9, 2016

(54) STATOR OF SEGMENTED CONDUCTOR TYPE ELECTRIC ROTARY MACHINE AND FABRICATION METHOD THEREOF

(71) Applicant: HONDA MOTOR CO., LTD., Tokyo (JP)

(72) Inventor: Yoshihisa Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/273,635

(22) Filed: May 9, 2014

(65) Prior Publication Data
US 2014/0339948 A1  Nov. 20, 2014

(30) Foreign Application Priority Data
May 16, 2013  (JP) .................................. 2013-104011

(51) Int. Cl.
| | |
|---|---|
| *H02K 3/28* | (2006.01) |
| *H02K 3/14* | (2006.01) |
| *H02K 3/48* | (2006.01) |
| *H02K 15/02* | (2006.01) |
| *H02K 3/12* | (2006.01) |
| *H02K 3/50* | (2006.01) |
| *H02K 15/04* | (2006.01) |

(52) U.S. Cl.
CPC .. *H02K 3/14* (2013.01); *H02K 3/12* (2013.01); *H02K 3/28* (2013.01); *H02K 3/48* (2013.01); *H02K 3/50* (2013.01); *H02K 15/02* (2013.01); *H02K 15/0421* (2013.01); *Y10T 29/49009* (2015.01)

(58) Field of Classification Search
USPC .................................................. 310/178–210
See application file for complete search history.

(56) References Cited

U.S. PATENT DOCUMENTS

| | | | | |
|---|---|---|---|---|
| 2003/0132679 | A1* | 7/2003 | Kato .............................. | 310/179 |
| 2009/0276997 | A1* | 11/2009 | Akimoto et al. ................ | 29/596 |
| 2010/0187938 | A1* | 7/2010 | Yamamoto et al. ........... | 310/195 |
| 2012/0007460 | A1* | 1/2012 | Kitamura et al. ............. | 310/195 |

FOREIGN PATENT DOCUMENTS

| | | |
|---|---|---|
| JP | 2003-018778 A | 1/2003 |
| JP | 2003-169432 A | 6/2003 |
| JP | 2012-165624 A | 8/2012 |

OTHER PUBLICATIONS

Japanese Office Action dated Mar. 10, 2015, issued in corresponding JP Patent Application No. 2013-104011 with English translation (9 pages).

* cited by examiner

*Primary Examiner* — Naishadh Desai
(74) *Attorney, Agent, or Firm* — Westerman, Hattori, Daniels & Adrian, LLP

(57) ABSTRACT

One embodiment provides a stator of a segmented conductor type electric rotary machine including an annular stator core and coil. On at least one axial end portion of the stator core, the coils are disposed to form a coil end so that plural spanning portions of the coils are arranged continuously in a circumferential direction and so that circumferentially adjacent ones of the spanning portions partially overlap each other as seen in an axial direction. An apex portion of the spanning portion is twisted so that an intersecting state is formed as seen in a radial direction within a range where the spanning portion is exposed as seen in the axial direction.

12 Claims, 13 Drawing Sheets

STATOR OF SEGMENTED CONDUCTOR TYPE ELECTRIC ROTARY MACHINE AND FABRICATION METHOD THEREOF

CROSS-REFERENCE TO RELATED APPLICATION(S)

This application claims priority from Japanese Patent Application No. 2013-104011 filed on May 16, 2013, the entire contents of which are incorporated herein by reference.

FIELD

The embodiments described herein relate generally to a stator of a segmented conductor type electric rotary machine and a fabrication method thereof.

BACKGROUND

Electric vehicles and hybrid vehicles include an electric rotary machine as a drive source. In particular, in hybrid vehicles, there have been strong demands for reducing much the size of an electric rotary machine module to save space where to install it for the purpose of enabling the coexistence with an engine or ensuring the riding comfort. On the other hand, there are demands for electric rotary machines of higher output, and to this end, various countermeasures have been studied including the increase in the number of turns of a stator coil, the generation of high voltages by improving the insulation performance and the like.

In a coil end construction of an electric rotary machine as shown in FIGS. 9 and 10, a coil 113 is made up of U-shaped coil segments 100 which are each made up of a bundle of flat angular wires W in which plural flat angular wires 101 are aligned together side by side and which each have a pair of leg portions 102 and a connecting portion 103 in which an S-shaped portion 104 which is curved into an S-shape is provided at a middle portion thereof and which connects both the leg portions 102 together (for example, refer to JP-2012-165624-A).

The coil 113 is formed by inserting a pair of leg portions 102 of each of plural coil segments 100 into different slots 112 in a stator core 111, forming a spanning portion 114 which spans from a radially inner side of one slot 112 to a radially outer side of the other slot 112 by the S-shaped portion 104, and folding projecting portions of the leg portions 102 which project from the stator core 111 in a circumferential direction so that corresponding leg portions 102 are connected together. By doing so, plural S-shaped portions 104 which each make up the spanning portion 114 of the coil segment 100 are disposed so as to overlap each other in the circumferential direction on one surface 111a of the stator core 111.

The coil segment 100 is formed based on a procedure shown in FIGS. 11A to 11C. Firstly, as shown in FIG. 11A, a central portion of a bundle of flat angular wires W in which plural flat angular wires 101 are aligned together with their wider surfaces arranged to be opposite to each other is bent by a movable die 121 and a fixed die 122 to form an S-shaped portion 104. Following this, as shown in FIG. 11B, the central portion of the bundle of flat angular wires W is pressed substantially into a V-shape by a projecting die 123 and a recessed die 124 which each have sloping surfaces of a predetermined angle on both left- and right-hand sides thereof to form sloping portions 105 on both sides of the S-shaped portion 104. Thereafter, as shown in FIG. 11C, the bundle of flat angular wires W is disposed on a leg portion forming die 125, and a pair of L-shaped dies 126 are lowered to bend both end portions of the bundle of flat angular wires W to form a pair of leg portions 102.

In JP-2012-165624-A, the surfaces of the flat angular wires 101 which face each other in the slot 112 are also made to face each other at the end of the coil so that the size of the electric rotary machine is reduced without affecting badly the insulation coatings of the flat angular wires 101.

However, in JP-2012-165624-A, as shown in FIGS. 12A and 12B, when attempting to form a coil end in which a spanning height is reduced by placing sloping portions 105 of adjacent coil segments 100A to 100C as close to each other as possible or contacting them together, in reality, as shown in FIG. 13A, a corner portion 101a of one of flat angular wires 101 of the coil segment 100A comes to interfere with the coil segment 100B at a transition portion 106 between the sloping portions 105 of the coil segment 100A, causing a problem that the insulation performance is reduced. Because of this, when attempting to ensure an insulating distance required at the transition portion 106 or to form a coil end via an insulating material, as shown in FIG. 13B, the sloping portions 105 are spaced apart from each other or the spanning height is increased, which increases the size of the electric rotary machine, causing a problem that the installation of the electric rotary machine into a vehicle is deteriorated.

SUMMARY

One object of the embodiments is to provide a stator of a segmented conductor type electric rotary machine which can suppress a spanning height of a coil and can ensure a required insulation performance, and a fabrication method of the stator.

The embodiments provides following Aspects 1 to 8.

1. A stator (e.g., a stator 10 in embodiment) of a segmented conductor type electric rotary machine including:

an annular stator core (e.g., a stator core 13 in embodiment) which includes plural slots (e.g., slots 14 in embodiment); and coils (e.g., stator coils 15 in embodiment) which are inserted into the slots, wherein, on at least one axial end portion (e.g., an end portion 13c in embodiment) of the stator core, the coils are disposed to form a coil end so that plural spanning portions (e.g., connecting portions 22 in embodiment) of the coils are arranged continuously in a circumferential direction and so that circumferentially adjacent ones of the spanning portions partially overlap each other as seen in an axial direction, each spanning portion spanning from a radially inner portion of one of the slots to a radially outer portion of another one of the slots, and wherein an apex portion (e.g., an apex portion 29 in embodiment) of the spanning portion is twisted so that an intersecting state is formed as seen in a radial direction within a range (e.g., a range S in embodiment) where the spanning portion is exposed as seen in the axial direction.

2. The stator of Aspect 1, wherein a radially outer portion of the spanning portion expands radially outwards relative to the apex portion as seen in the axial direction.

3. The stator of Aspect 1 or 2, wherein a radially inner portion of the spanning portion expands radially inwards relative to the apex portion as seen in the axial direction.

4. The stator of any one of Aspects 1 to 3, wherein the spanning portion is made up of plural coil segments (e.g., coil segments 23 in embodiment) which are aligned together side by side into a bundle, and wherein the apex portion of the spanning portion is twisted so that adjacent ones of the coil segments are attached closely to each other.

5. A fabrication method of a stator (e.g., the stator 10 in embodiment) of a segmented conductor type electric rotary machine which includes an annular stator core (e.g., the stator core 13 in embodiment) which includes plural slots (e.g., the slots 14 in embodiment), and coils (e.g., the stator coils 15 in embodiment) which are inserted into the slots, the method including:

twisting an apex portion (e.g., the apex portion 29 in embodiment) of a spanning portion (e.g., the connecting portion 22 in embodiment) of each coil on at least one axial end portion (e.g., the end portion 13c in embodiment) of the stator core so that an intersecting state is formed as seen in a radial direction, each spanning portion spanning from a radially inner portion of one of the slots to a radially outer portion of another one of the slots; and disposing the coils in the slots in the stator core so that the plural spanning portions are arranged continuously in a circumferential direction and so that circumferentially adjacent ones of the spanning portions partially overlap each other as seen in an axial direction.

6. The method of Aspect 5, further including:

expanding a radially outer portion of the spanning portion radially outwards relative to the apex portion as seen in the axial direction.

7. The method of Aspect 5 or 6, further including:

expanding a radially inner portion of the spanning portion radially inwards relative to the apex portion as seen in the axial direction.

8. The method of any one of Aspect 5 to 7, wherein, in the step of twisting, an apex portion of the spanning portion is formed by twisting altogether plural coil segments (e.g., the coil segments 23 in embodiment) which are aligned together side by side into a bundle so that adjacent ones of the coil segments are attached closely to each other.

According to Aspects 1 and 5, even in a case where the plural spanning portions are disposed so as to lie continuously in the circumferential direction while partially overlapping each other, the height of the spanning portions of the coil can be suppressed, whereby the size of the electric rotary machine can be reduced.

According to Aspects 2, 3, 6 and 7, the range where the spanning portions are exposed as seen in the axial direction can be expanded, thereby facilitating the twisting process.

According to Aspects 4 and 8, the spanning portions can be prevented from being enlarged, thereby reducing the size of the coil end.

DETAILED DESCRIPTION

Figure 1:
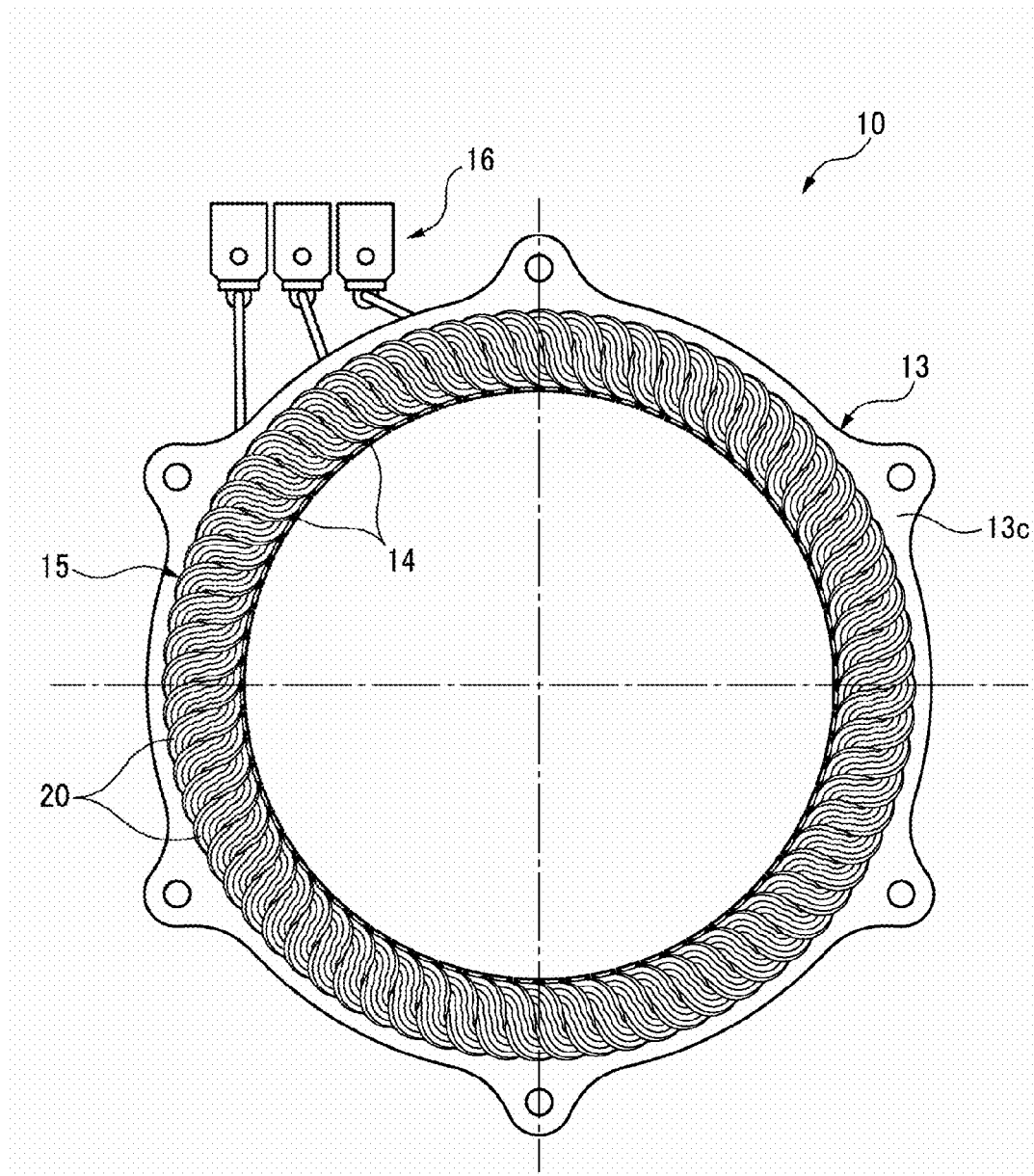
FIG. 1 is a front view of a stator according to an embodiment.

Hereinafter, a stator of a segmented conductor type electric rotary machine and a fabrication method thereof according to an embodiment will be described based on the accompanying drawings. It is noted that the drawings should be seen in a direction in which given reference numerals look normally.

Figure 2:
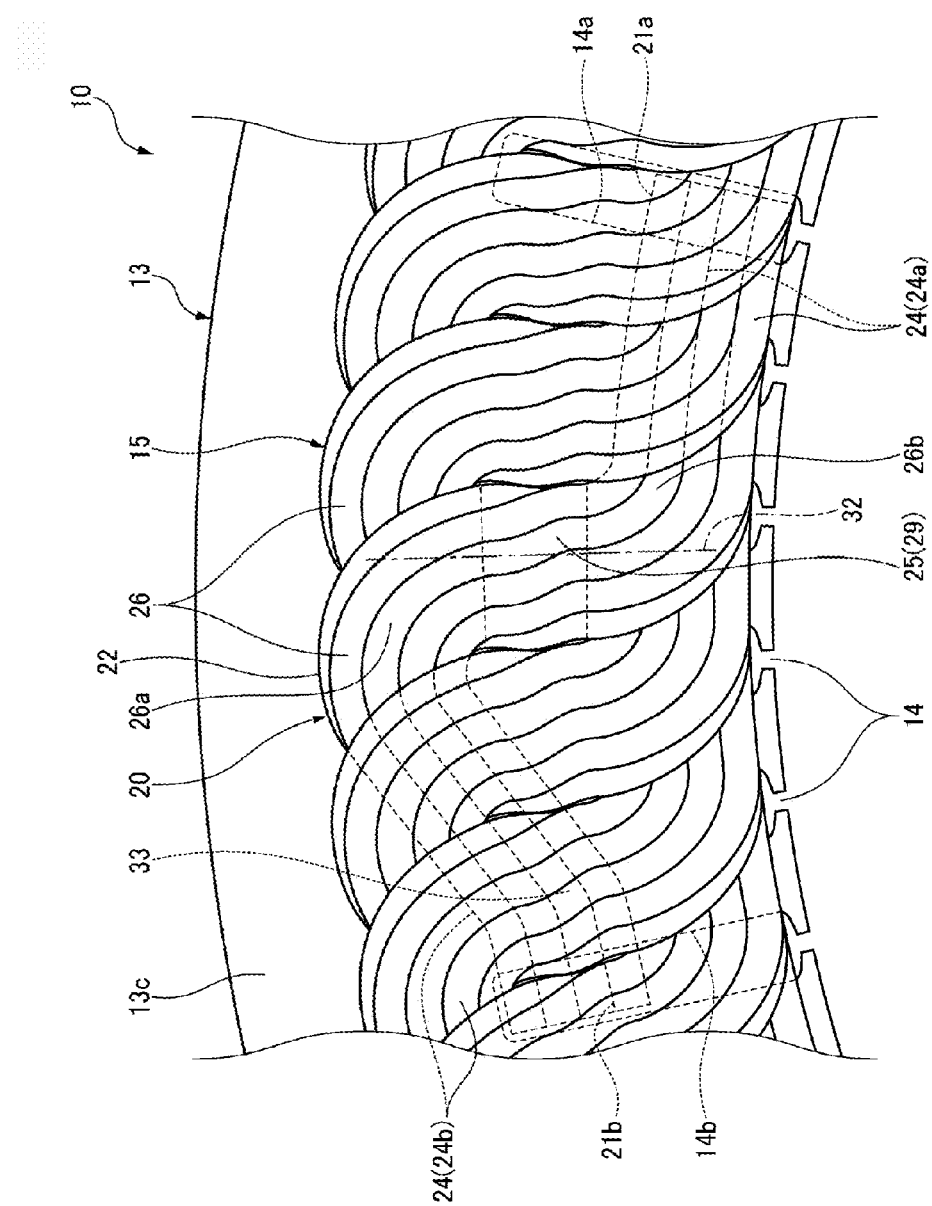
FIG. 2 is an enlarged view of a main part in FIG. 1.

As shown in FIGS. 1 and 2, a stator 10 of this embodiment includes a stator core 13 in which plural slots 14 which penetrate the stator core 13 in an axial direction are disposed at predetermined intervals in a circumferential direction and stator coils 15 of plural phases (for example, a U phase, a V phase, a W phase) which are accommodated in the slots. Feeding portions 16 are connected individually to the stator coils 15 so that electric power is supplied thereto from an external power supply. A rotor, not shown, is disposed rotatably inside the stator 10, and the stator 10 and the rotor are accommodated in a casing, not shown, to make up an electric rotary machine.

Figure 3A:
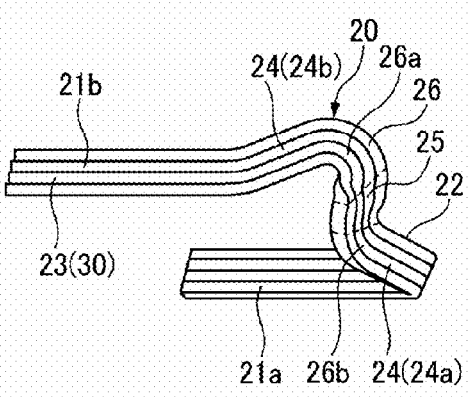
FIG. 3A is a perspective view of a group of coil segments.
Figure 3B:
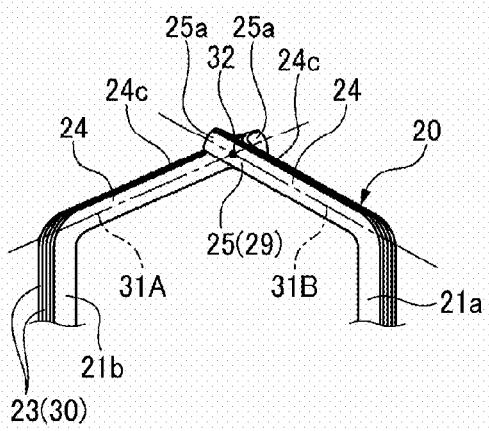
FIG. 3B is a side view of a group of coil segments.

The stator coils 15 are formed of plural coil segment groups 20. Each coil segment group 20 is formed of a predetermined number of substantially U-shaped coil segments 23 which are aligned together side by side into a bundle. Each U-shaped coil segment 23 is a flat angular wire 30 rectangular in cross section and has, as shown in FIGS. 3A and 3B, a pair of leg portions 21a, 21b which extend parallel to each other and a connecting portion 22 which connects together both the leg portions 21a, 21b at end portions thereof. As shown in FIG. 2, one leg portion 21a of each coil segment 23 is inserted into a radially inner portion of one slot 14a, and the other leg portion 21b is inserted into a radially outer portion of another slot 14b which is situated a predetermined number of slots away from the slot 14a. Consequently, the connecting portion 22 makes up a spanning portion which spans from the radially inner portion of the slot 14 to the radially outer portion of the different slot for connection on one axial end portion 13c of the stator core 13.

The stator coils 15 are disposed so that the connecting portions 22 of the plural coil segment groups 20 lie continuously in the circumferential direction and that circumferentially adjacent ones of the connecting portions 22 partially overlap each other as seen in an axial direction to thereby form their coil ends on the one axial end portion 13c of the stator core 13.

In this embodiment, too, in each coil segment group 20, the coil segments 23 are aligned together side by side so that wider surfaces of the flat angular wires 30 become opposite to each other. Additionally, the coil segments 23 are disposed so that surfaces of the flat angular wires 30 which face each other at the leg portions 21a, 21b also similarly face each other at the connecting portion 22. A curved portion 26 which is curved substantially into an S-shape is formed at a central portion of the connecting portion 22 by bending the central portion along the direction in which the coil segments 23 are aligned at least at two locations 26a, 26b where the bending direction is changed alternately.

Figure 7A:
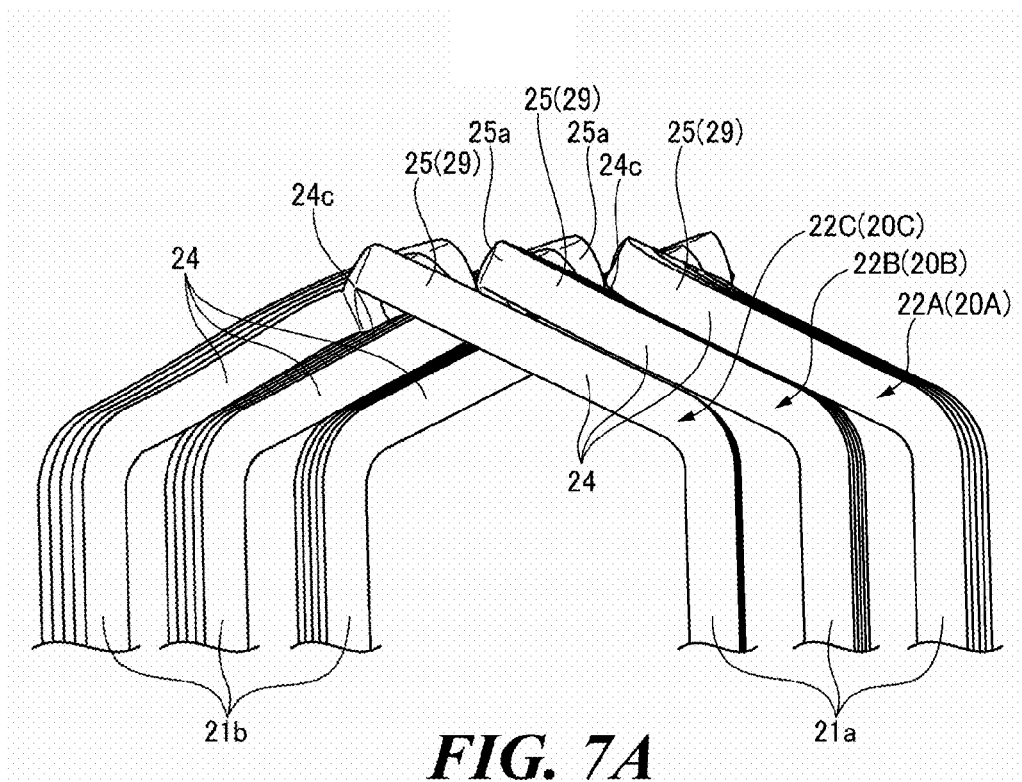
FIG. 7A is a view of the three coil segment groups in FIG. 6 as seen in a radial direction.
Figure 7B:
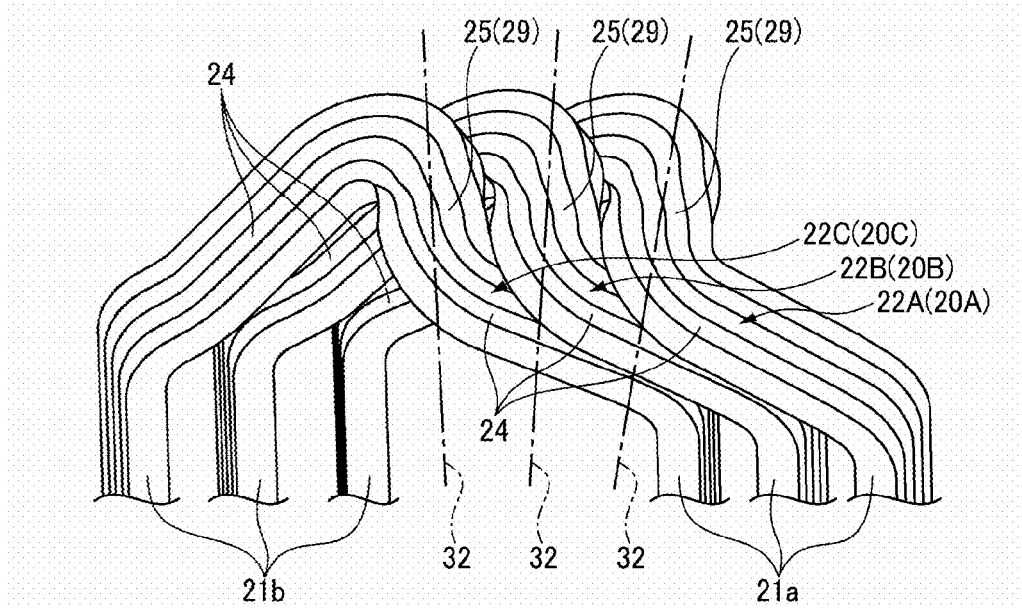
FIG. 7B is a perspective the three coil segment groups in FIG. 6.

In this embodiment, the connecting portion 22 has a twisted portion 25 which is twisted so as to form an intersecting state as seen in a radial direction within a range where the connecting portion 22 is exposed as seen in the axial direction (refer to FIGS. 7A and 7B).

Figure 6:
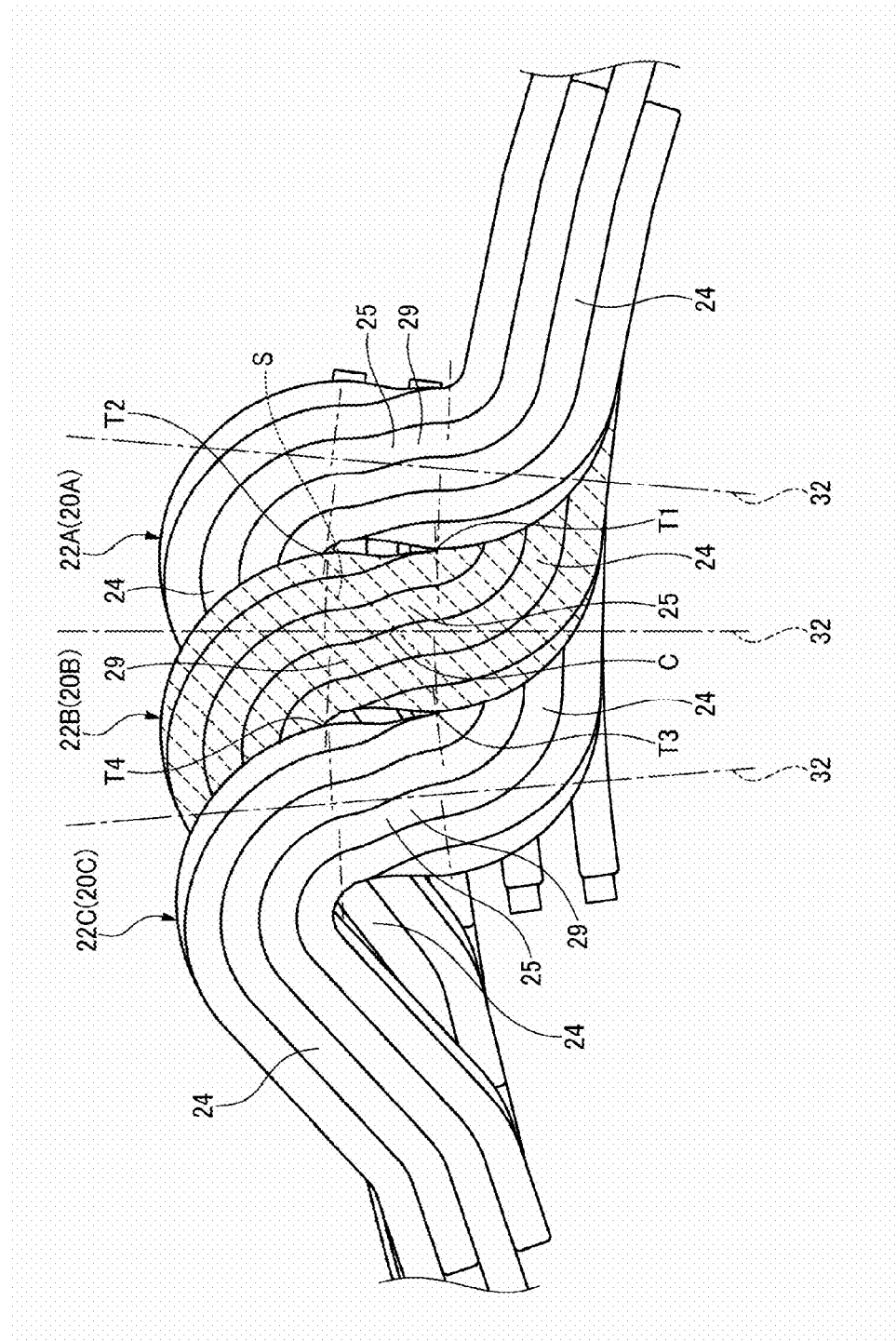
FIG. 6 is a front view which shows three selected coil segment groups.

Namely, as shown in FIG. 6, for example, in connecting portions 22A to 22C of three coil segment groups 20A to 20C which are aligned in the circumferential direction, a twisted portion 25 of the connecting portion 22B is not covered by the connecting portion 22A and the connecting portion 22C as seen in the axial direction. That is, the twisted portion 25 is formed within a range (an area S shaded with slant lines in FIG. 6) which is exposed as seen in the axial direction. In particular, in this embodiment, the twisted portion 25 is formed within a range which is defined by connecting a radially inner boundary position T1 and a radially outer boundary position T2 where the coil segments 23 of the connecting portion 22A and the connecting portion 22B which lie adjacent to each other in the circumferential direction start to overlap each other as seen in the axial direction and a radially inner boundary position T3 and a radially outer boundary position T4 where the coil segments 23 of the connecting portion 22B and the connecting portion 22C which lie adjacent to each other in the circumferential direction start to overlap each other as seen in the axial direction.

At this twisted portion 25, the plural coil segments 23 are twisted altogether along a twisting axis 32 which extends through middle portions of the flat angular wires 30 along a direction in which the middle portions extend so that the adjacent coil segments 23 are attached closely to each other. Additionally, referring to the twisted portion of the connecting portion 22B in FIG. 6, a radially outer portion and a radially inner portion of the twisted portion 25 are twisted along the twisting axis 32 in opposite directions with respect to a radially middle portion C. That is, the radially outer portion of the twisted portion 25 is twisted relative to the radially middle portion C in a direction in which the connecting portion 22B moves away from the connecting portion 22A to approach the connecting portion 22C, while the radially inner portion of the twisted portion 25 is twisted relative to the radially middle portion C in a direction in which the connecting portion 22B moves away from the connecting portion 22C to approach the connecting portion 22A. By doing so, an apex portion 29 where the twisted portion 25 is formed and a pair of sloping portions 24 which extend in a sloping fashion in directions in which the leg portions 21a, 21b extend between the apex portion 29 and the leg portions 21a, 21b are formed at the connecting portion 22.

Because of this, as shown in FIGS. 3B, 7A and 7B, the portions where the pair of sloping portions 24 are formed are formed substantially into a flat surface. Additionally, the intersecting state is formed at the twisted portion 25 as seen in the radial direction, whereby a portion 25a is formed which projects from an axial outer surface 24c of each sloping portion 24 as seen in the radial direction. The twisting axis 32 constitutes a line where surfaces 31A, 31B which are formed by the pair of sloping portions 24 intersect each other.

Figure 4A:
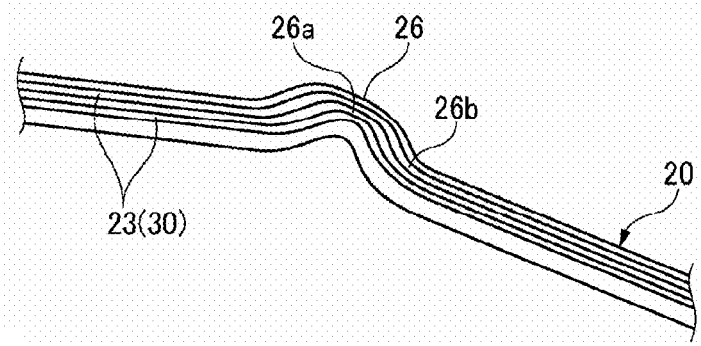
FIG. 4A is a view of the coil segment group which illustrates a bending step.

In the coil segment group 20 which is shaped as described above, firstly, as shown in FIG. 4A, a predetermined number of (four in the illustrated embodiment) flat angular wires 30 are aligned together side by side into a flat bundle with wider surfaces thereof laid opposite to each other, and a central portion of the bundle of flat angular wires 30 is bent along a direction in which the flat angular wires 30 are aligned at least at two locations where the bending direction changes alternately so that the central portion is curved substantially into an S-shape, whereby a curved portion 26 is formed at the central portion.

Figure 4B:
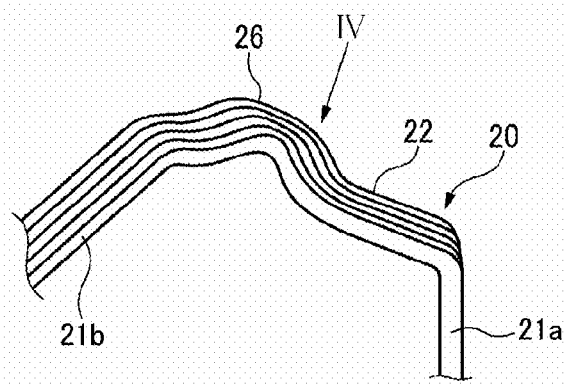
FIG. 4B is a view of the coil segment group which illustrates a leg portion forming step.

Following this, as shown in FIG. 4B, both ends of the central portion which are situated by a predetermined distance from the curved portion 26 are bent to form a pair of leg portions 21a, 21b. As this occurs, the pair of leg portions 21a, 21b are bent while being twisted to be oriented in different directions from each other by a predetermined angle in the following step so that the pair of leg portions 21a, 21b become parallel to each other. A portion defined between the bent portions at the ends of the central portion constitutes a connecting portion 22.

Figure 4C:
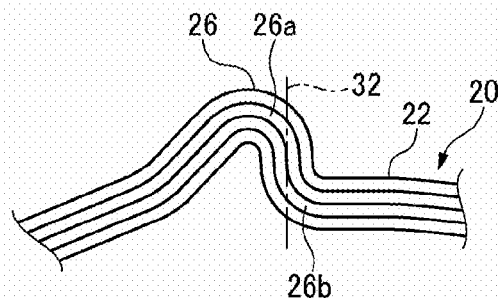
FIG. 4C is a view of the coil segment group as seen in a direction indicated by IV.
Figure 4D:
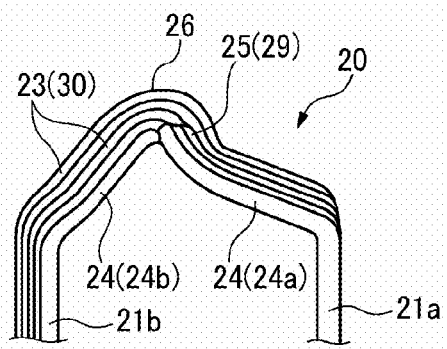
FIG. 4D is a view of the coil segment group which illustrates a twisting step.

As shown in FIG. 4C, a portion of the curved portion 26 which lies closer to the leg portion 21a is twisted relative to the bent portion 26a of the curved portion 26 along the twisting axis 32 which extends through the middle portion in the direction in which the flat angular wires 30 are aligned along the direction in which the flat angular wires 30 extend to thereby form a twisted portion 25. By dosing so, as shown in FIG. 4D, a coil segment group 20 is formed which has an apex portion 29 where the twisted portion 25 is formed and a pair of sloping portions 24 which extend from the apex portion 29 as a boundary therebetween in a sloping fashion with respect to the directions in which the leg portions 21a, 21b extend.

As shown in FIG. 2, in the stator coil 15, the leg portion 21a of each coil segment 23 of the coil segment group 20 described above is inserted into a radially inner portion of one slot 14a while the other leg portion 21b thereof is inserted into a radially outer portion of another slot 14b which is situated a predetermined number of slots away from the one slot 14a, and the connecting portion 22 is disposed on the one axial end portion 13c of the stator core 13. As this occurs, the sloping portion 24a which is situated closer to the leg portion 21a extends substantially in the circumferential direction, is curved radially outwards at the bent portion 26b of the curved portion 26 and then extends to the apex portion 29. The other sloping portion 24b which is situated closer to the other leg portion 21b extends substantially in the circumferential direction, is thereafter curved at a bend portion 33 so as to extend radially outwards as it extends circumferentially, is then curved radially inwards at the bent portion 26a of the curved portion 26 and extends to the apex portion 29. As this occurs, the bent portion 26a of the curved portion 26 is situated further radially outwards than the slot 14.

Figure 5:
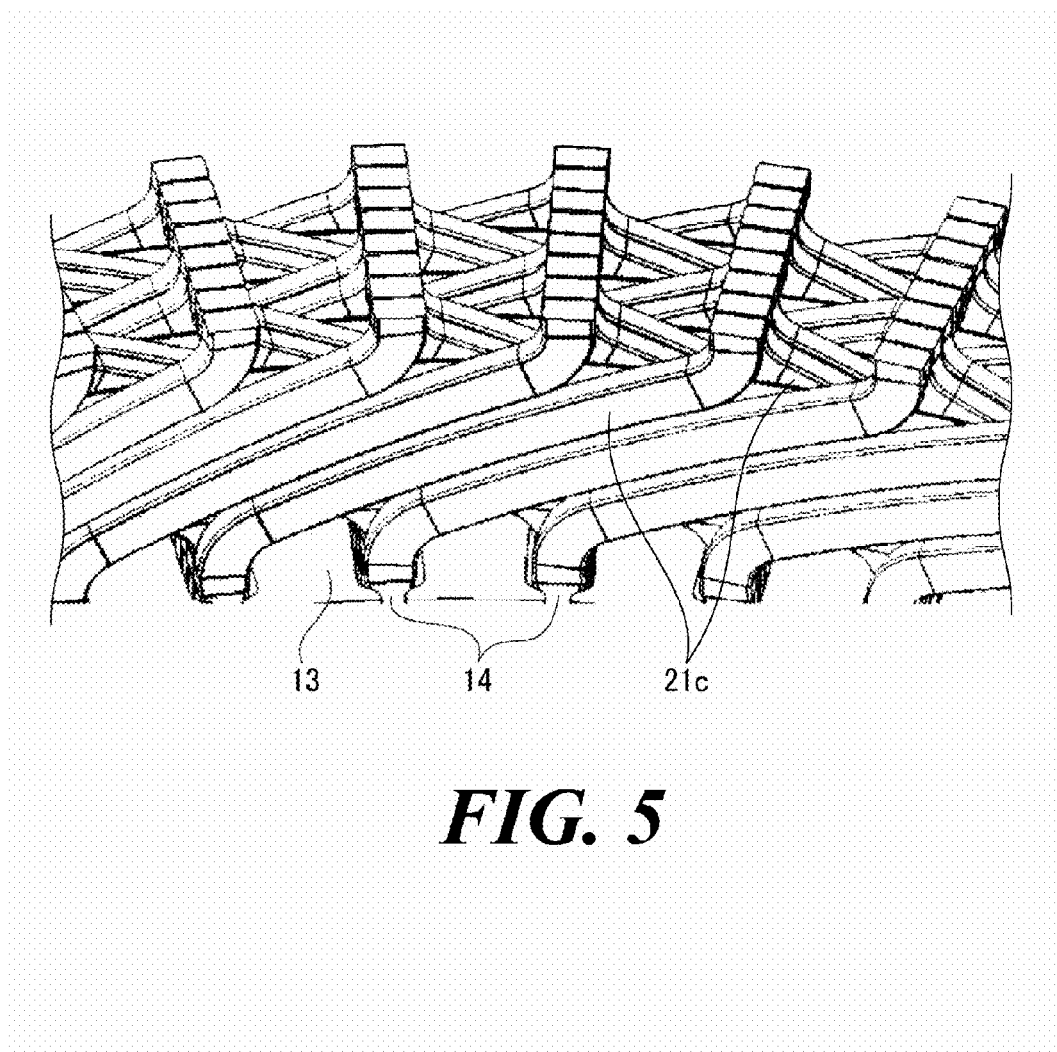
FIG. 5 is a partial perspective view of a side of the stator where leg portions of the coil segments are joined.

Consequently, in this embodiment, eight coil segments 23 are disposed within one slot 14. Then, as shown in FIG. 5, projecting portions 21c of the pair of leg portions 21a, 21b which pass through the slots 14 to project from the stator core 13 are bent in the circumferential direction of the stator core 13 so that the leg portions 21a, 21b which lie adjacent to each other in the radial direction within the slot 14 are bent in opposite directions so as to be joined to the corresponding coil segments 23.

Figure 8A:
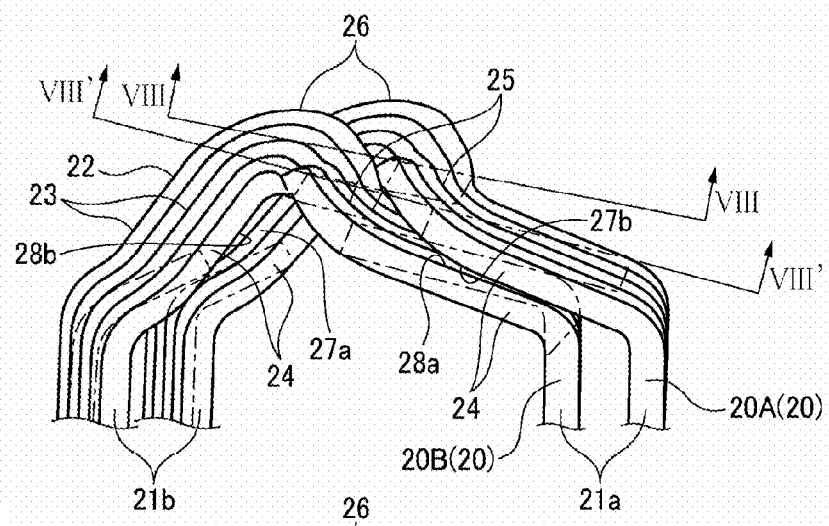
FIG. 8A is a perspective view of a main part which shows a pair of adjacent coil segment groups which are taken out of plural coil segment groups whose leg portions are inserted into slots of the stator.
Figure 8B:
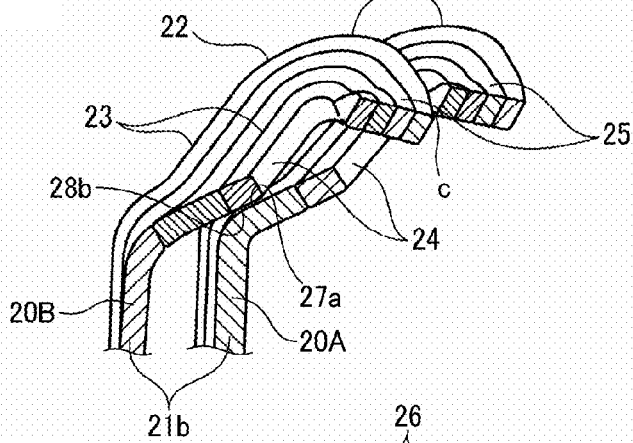
FIG. 8B is a sectional view taken along the line VIII-VIII in FIG. 8A.
Figure 8C:
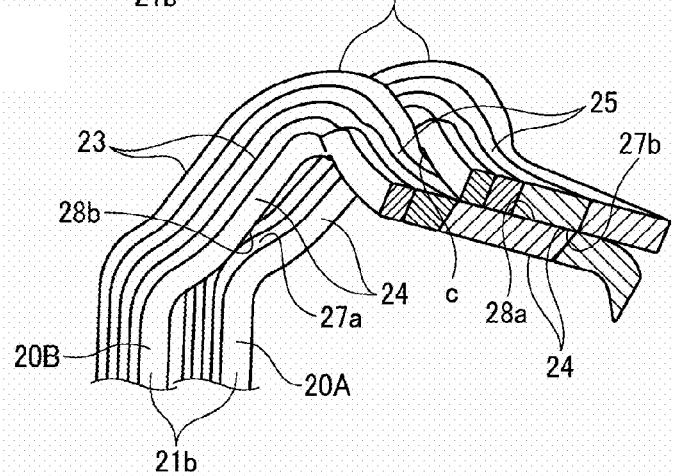
FIG. 8C is a sectional view taken along the line VIII'-VIII' in FIG. 8A.
Figure 9:
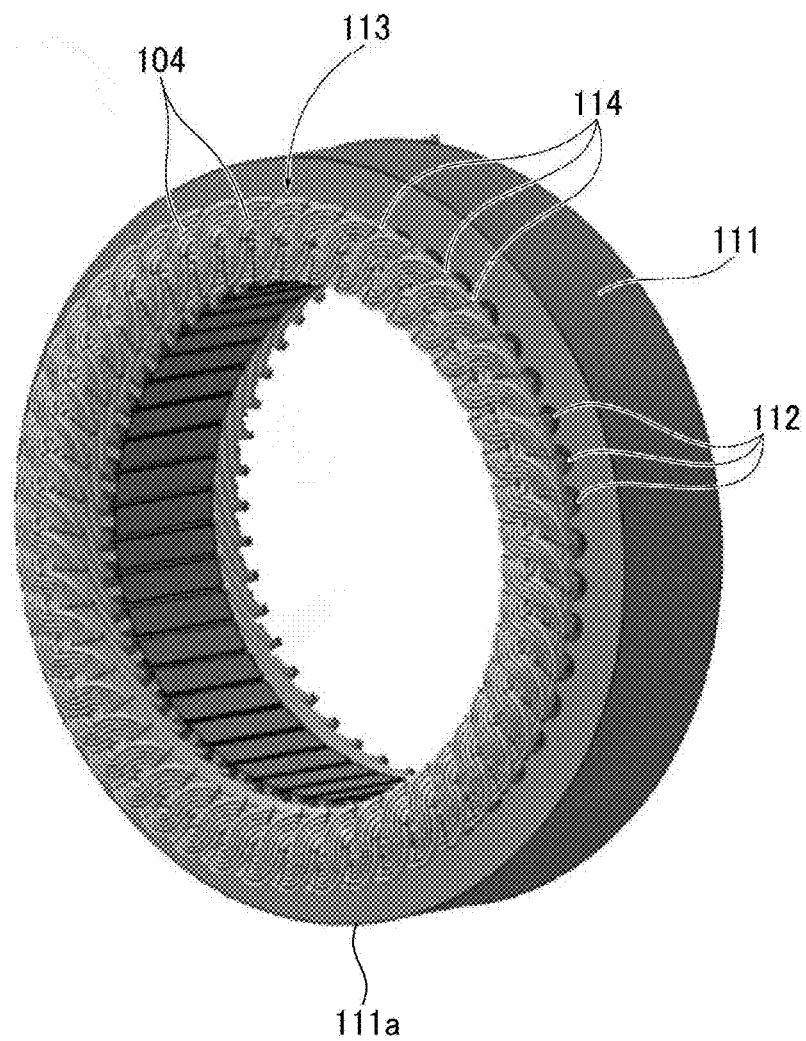
FIG. 9 is a perspective view of a conventional stator.
Figure 10:
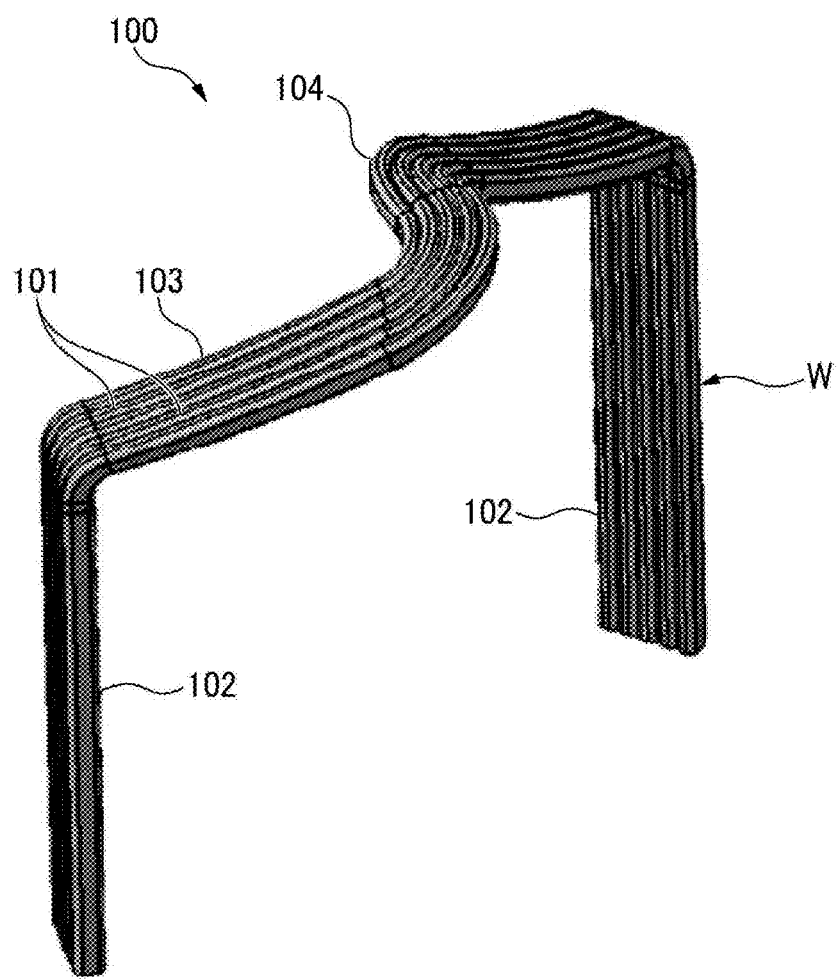
FIG. 10 is a perspective view of a conventional group of coil segments.
Figures 11A, 11B, 11C:
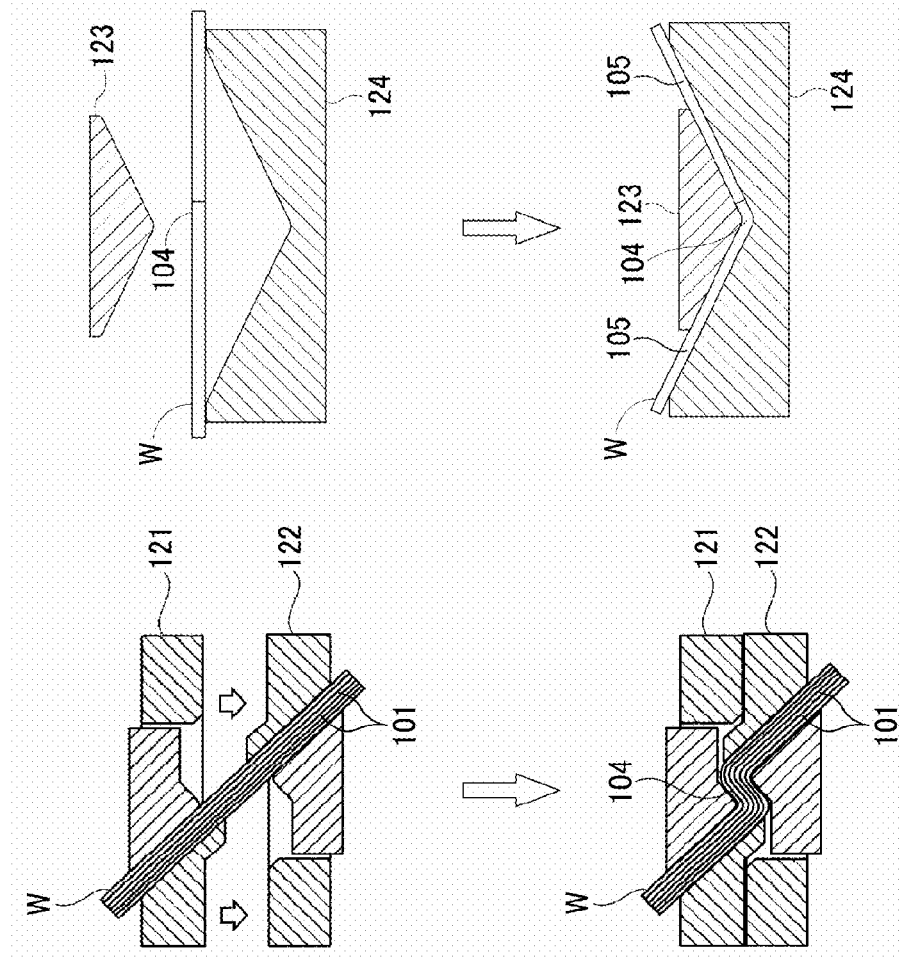
FIGS. 11A to 11C are diagrams showing a working process of the coil segment group shown in FIGS. 5A to 8C.
Figure 12A:
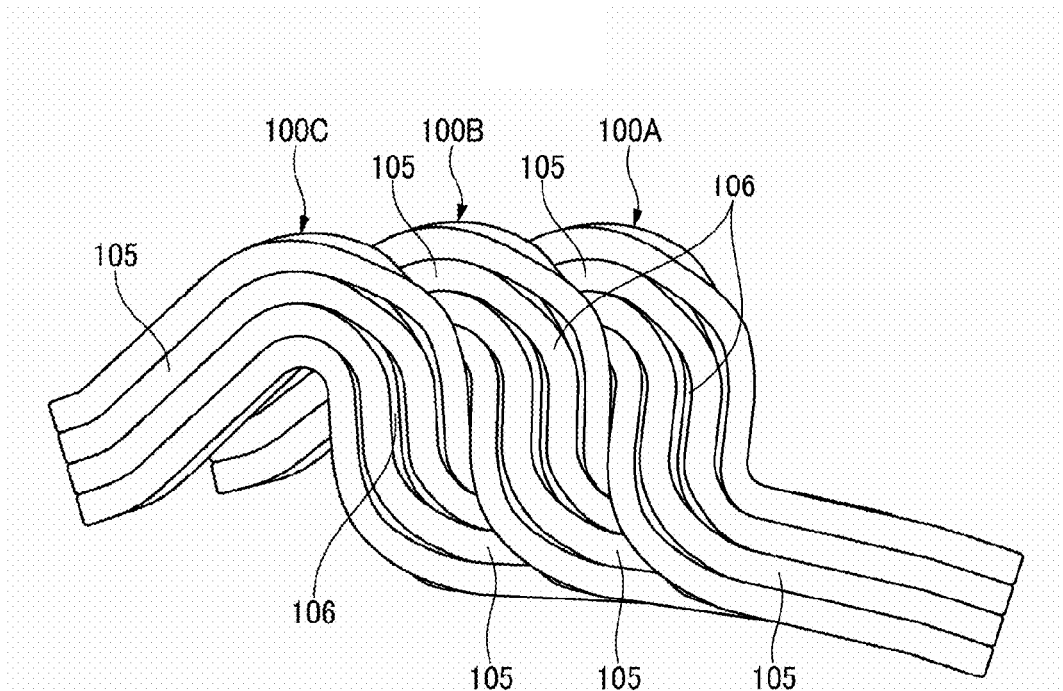
FIG. 12A is a front view a coil end in which a spanning height is reduced by using conventional coil segment groups.
Figure 12B:
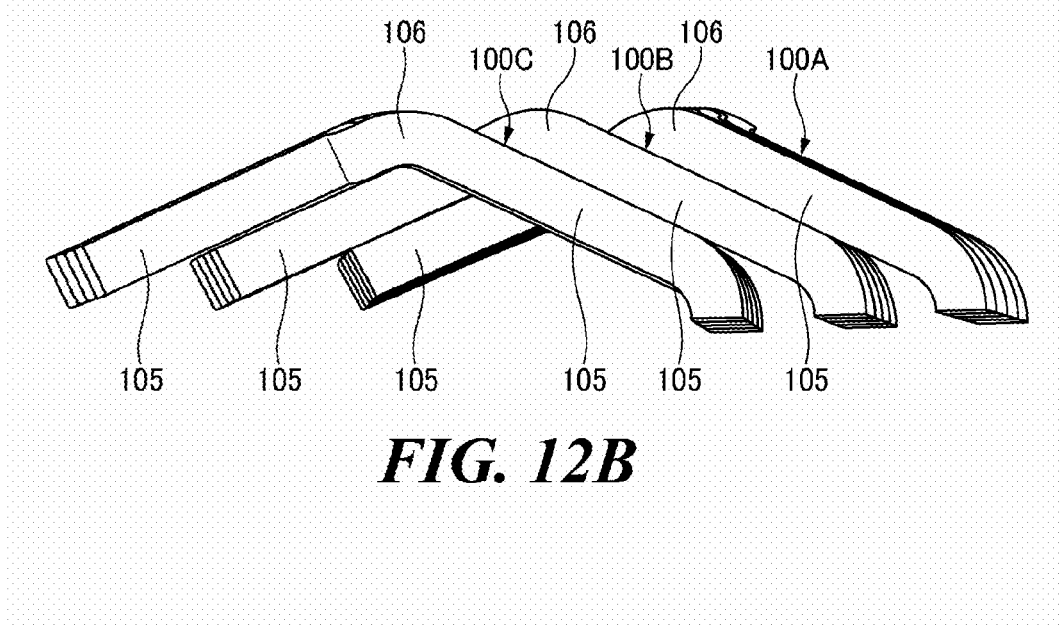
FIG. 12B is a side view of the coil in FIG. 12A.
Figure 13A:
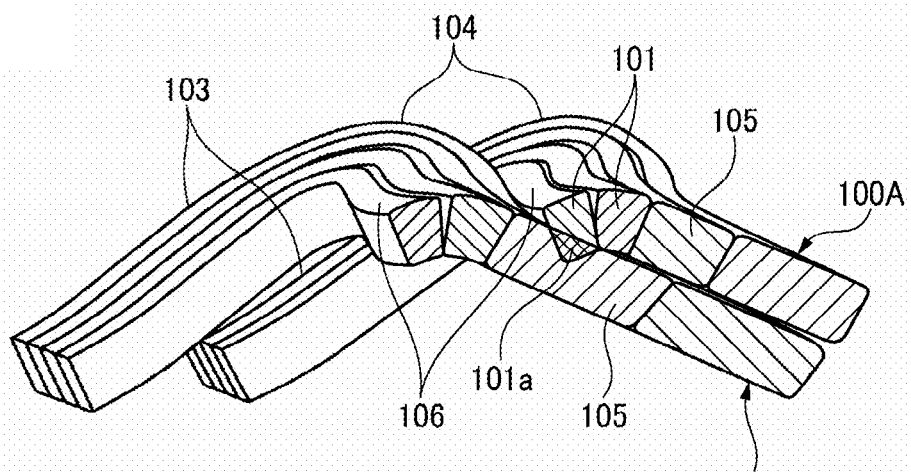
FIG. 13A is a sectional view of a main part of the conventional coil segment groups which shows a state in which a pair of adjacent coil segment groups interfere with each other at their transition portions.
Figure 13B:
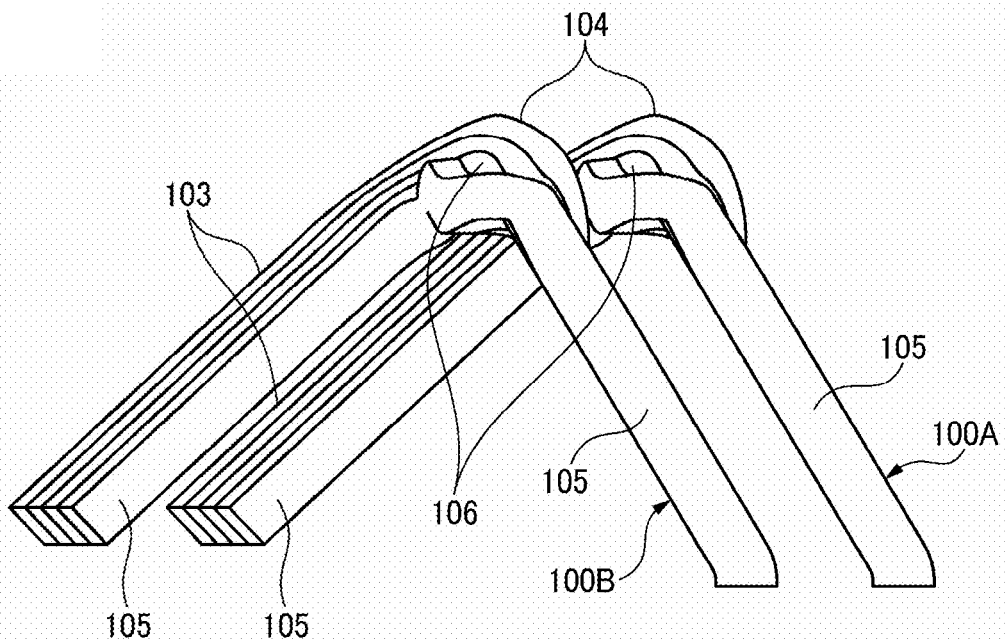
FIG. 13B is a perspective view of a main part of the conventional coil segment groups which shows only a pair of coil segment groups which are selected for illustration.

When the stator coils 15 are formed in the way described above, as shown in FIG. 2, the connecting portions 22 of the plural coil segment groups 20 are disposed so as to lie continuously in the circumferential direction while partially overlapping each other on the one axial end portion 13c of the stator core 13. FIG. 8A shows the pair of circumferentially adjacent coil segment groups which are taken out of the three coil segment groups, FIG. 8B is a sectional view taken along the line VIII-VIII in FIG. 8A, and FIG. 8C is a sectional view taken along the line in FIG. 8A. Namely, the circumferentially adjacent coil segment groups 20A, 20B overlap in the axial direction with an axially outer surface 27a of the coil segment group 20A lying close to or in contact with an axially inner surface 28b of the other coil segment group 20B in a sectional position as shown in FIG. 8B at a radially outer side, while in a sectional position as shown in FIG. 8C at a radially inner side, the coil segment groups 20A, 20B overlap in the axial direction with an axially inner surface 27b of the coil segment group 20A lying close to or in contact with an axially outer surface 28a of the other coil segment group 20B. Consequently, each coil segment group 20 is held on both the radially outer and inner sides thereof by the pair of coil segment groups 20 which are situated on both sides thereof in the circumferential direction with both the axially inner and outer surfaces thereof lying close to or in contact with the pair of coil segment groups 20. Thus, the individual coil segment groups are held stably.

Additionally, when the circumferentially adjacent coil segment groups 20A, 20B are disposed even close to or in contact with each other on both the radially inner and outer sides thereof in the way described above, a clearance "c" can be ensured between the twisted portions 25 to thereby prevent the interference of the coil segments 23 thereof, whereby the insulation performance between the coil segment groups 20 is ensured. Because of this, the spanning height does not have to be increased to avoid the interference of the coil segments 23 of the two coil segment groups 20, and only the required number of twisted portions 25 to span the predetermined number of slots should be twisted.

Thus, as has been described heretofore, according to the stator 10 for an electric rotary machine and the fabrication method thereof according to the embodiment, the coils 15 are disposed so that the plural connecting portions 22 which each span from the radially inner portion of one slot 14a to the radially outer portion of another slot 14b for connection lie continuously in the circumferential direction and that the circumferentially adjacent connecting portions 22 partially overlap each other as seen in the axial direction on at least the one axial end portion 13c of the stator core 13, and the apex portion 29 of the connecting portion 22 is twisted so that the intersecting state is formed as seen in the radial direction within the range S where the connecting portion 22 is exposed as seen in the axial direction. Thus, when the connecting portions 22 are disposed even in such a way that the connecting portions 22 lie continuously in the circumferential direction and partially overlap each other, the spanning height of the stator coils 15 can be suppressed, whereby the size of the electric rotary machine can be reduced.

The radially outer portion of the connecting portion 22 expands radially outwards relative to the apex portion 29 as seen in the axial direction due to the bent portion 26a of the curved portion 26, and this can expand the range S, thereby facilitating the twisting process.

The connecting portion 22 is formed by aligning the plural coil segments 23 side by side in a row, and the apex portion 29 of the connecting portion 22 is twisted so that the adjacent coil segments 23 are attached closely to each other. This can suppress the enlargement of the connecting portion 22 which enlarges the coil end.

The invention is not limited to the embodiment that has been described above and hence can be modified or improved as required.

It is sufficient that the twisted portion 25 is twisted within the range S where the connecting portion 22 is exposed as seen in the axial direction. That is, the twisted portion 25 may be twisted so as to be across the apex portion 29 to expand over an area which includes the radially inner side and the radially outer side of the apex portion 29.

While the radially outer portion of the connecting portion 22 expands radially outwards relative to the apex portion 29 as seen in the axial direction in this embodiment, the radially inner portion of the connecting portion 22 may expand radially inwards relative to the apex portion 29 as seen in the axial direction. Alternatively, both the radially outer portion and the radially inner portion of the connecting portion 22 may expand radially relative to the apex portion 29 as seen in the axial direction.

The invention claimed is:

1. A stator of a segmented conductor type electric rotary machine comprising:
    an annular stator core which includes plural slots; and
    plural coil segments which are inserted into the slots,
    wherein, on at least one axial end portion of the stator core, the plural coil segments are disposed to form a coil end so that plural spanning portions of the plural coil segments are arranged continuously in a circumferential direction and so that circumferentially adjacent ones of the spanning portions partially overlap each other as seen in an axial direction of the stator core, each spanning portion spanning from a radially inner portion of one of the plural slots to a radially outer portion of another one of the plural slots, and
    wherein the spanning portion comprises:
    a first sloping portion, where a central portion of the plural coil segments extends axially outwards in the axial direction along a first sloping line as the central portion goes from the one of the plural slots to the another one of the plural slots, as seen in a radial direction;
    a second sloping portion, where the central portion of the plural coil segments extends axially outwards in the axial direction along a second sloping line as the central portion goes from the another one of the plural slots to the one of the plural slots, as seen in the radial direction;
    a first bent portion, where the plural coil segments are disposed in parallel and curve in such a way as to go in the radial direction from the first sloping portion; and
    a second bent portion, where the plural coil segments are disposed in parallel and curve in such a way as to go in the radial direction from the second sloping portion, wherein
    at a most radially inner coil segment of the plural coil segments in the first bent portion, a corner portion positioned at a side of the another one of the plural slots and at an outside in the axial direction as seen in the radial direction is located more axially outwards in the axial direction than an extension line of the first sloping line,
    at a most radially outer coil segment of the plural coil segments in the second bent portion, a corner portion positioned at a side of the one of the plural slots and at the outside in the axial direction as seen in the radial direction is located more axially outwards in the axial direction than an extension line of the second sloping line.

2. The stator of claim 1,
wherein the second bent portion expands radially outwards as seen in the axial direction.

3. The stator of claim 1,
wherein the first bent portion expands radially inwards as seen in the axial direction.

4. The stator of claim 1,
wherein the spanning portion is made up of the plural coil segments which are aligned together side by side into a bundle, and
wherein an apex portion of the spanning portion is twisted so that adjacent ones of the coil segments are attached closely to each other.

5. A fabrication method of a stator of a segmented conductor type electric rotary machine which comprises an annular stator core which includes plural slots, and plural coil segments which are inserted into the slots, the method comprising:
forming spanning portions of the plural coil segments, on at least one axial end portion of the stator core, each spanning portion spanning from a radially inner portion of one of the plural slots to a radially outer portion of another one of the plural slots; and
disposing the plural coil segments in the plural slots in the stator core so that the plural spanning portions are arranged continuously in a circumferential direction and so that circumferentially adjacent ones of the spanning portions partially overlap each other as seen in an axial direction,
wherein the spanning portion comprises:
a first sloping portion, where a central portion of the plural coil segments extends axially outwards in the axial direction along a first sloping line as the central portion goes from the one of the plural slots to the another one of the plural slots, as seen in a radial direction;
a second sloping portion, where the central portion of the plural coil segments extends axially outwards in the axial direction along a second sloping line as the central portion goes from the another one of the plural slots to the one of the plural slots, as seen in the radial direction;
a first bent portion, where the plural coil segments are disposed in parallel and curve in such a way as to go in the radial direction from the first sloping portion; and
a second bent portion, where the plural coil segments are disposed in parallel and curve in such a way as to go in the radial direction from the second sloping portion, wherein at a most radially inner coil segment of the plural coil segments in the first bent portion, a corner portion positioned at a side of the another one of the plural slots and at an outside in the axial direction as seen in the radial direction is located more axially outwards in the axial direction than an extension line of the first sloping line,
at a most radially outer coil segment of the plural coil segments in the second bent portion, a corner portion positioned at a side of the one of the plural slots and at the outside in the axial direction as seen in the radial direction is located more axially outwards in the axial direction than an extension line of the second sloping line.

6. The method of claim 5, further comprising:
expanding the second bent portion radially outwards as seen in the axial direction.

7. The method of claim 5, further comprising:
expanding the first bent portion radially inwards as seen in the axial direction.

8. The method of claim 5,
wherein, in the step of forming the spanning portions, an apex portion of the spanning portion is formed by twisting altogether plural coil segments which are aligned together side by side into a bundle so that adjacent ones of the plural coil segments are attached closely to each other.

9. The stator of claim 1,
wherein a cross state is formed between the plural coil segments that constitute the first bent portion and the plural coil segments that constitute the second bent portion, as seen in the radial direction.

10. The method of claim 5,
wherein a cross state is formed between the plural coil segments that constitute the first bent portion and the plural coil segments that constitute the second bent portion, as seen in the radial direction.

11. The stator of claim 1,
wherein the most radially inner coil segment of the plural coil segments in the first bent portion is located more axially outwards in the axial direction than other coil segment of the plural coil segments.

12. The method of claim 5,
wherein the most radially inner coil segment of the plural coil segments in the first bent portion is located more axially outwards in the axial direction than other coil segment of the plural coil segments.

* * * * *